United States Patent [19]
Toman

[11] 4,011,565
[45] Mar. 8, 1977

[54] METHOD OF DETERMINING IONOSPHERIC REFLECTION HEIGHT

[75] Inventor: Kurt Toman, Belmont, Mass.

[73] Assignee: The United States of America as represented by the Secretary of the Air Force, Washington, D.C.

[22] Filed: Apr. 19, 1976

[21] Appl. No.: 678,321

[52] U.S. Cl. .......................... 343/112 A; 343/12 R
[51] Int. Cl.² .......................................... G01S 3/02
[58] Field of Search ....... 343/112 A, 100 CS, 12 R, 343/12 A; 325/67

[56] References Cited

UNITED STATES PATENTS

| | | | |
|---|---|---|---|
| 3,333,264 | 7/1967 | Knepper | 343/12 R |
| 3,665,466 | 5/1972 | Hibbard | 343/12 R |

Primary Examiner—Maynard R. Wilbur
Assistant Examiner—T. M. Blum
Attorney, Agent, or Firm—Joseph E. Rusz; George Fine

[57] ABSTRACT

A method for determining the ionospheric reflection height from doppler measurements made over an oblique radio transmission involving reflection of signals from a boundary. This method makes use of multi-hop reflections. The unknown motion of the reflection boundary is eliminated by taking the doppler-shift ratio for a pair of transmission hops. The height of the reflection boundary may be computed from this ratio for the particular distance that separates transmitter from receiver. The equations used follow from relatively simple geometrical considerations derived from spherical boundaries.

3 Claims, 3 Drawing Figures

METHOD OF DETERMINING IONOSPHERIC REFLECTION HEIGHT

STATEMENT OF GOVERNMENT INTEREST

The invention described herein may be manufactured and used by or for the Government for governmental purposes without the payment of any royalty thereon.

BACKGROUND OF THE INVENTION

Ionospheric doppler measurements made at the carrier frequency of an oblique radio transmission provide a very sensitive means of measuring ionospheric phase path variations, but preclude the determination of phase path, from which a reflection height could be inferred because of phase ambiguity. Phase path P defined with reference to the transit time $T_p$, between a transmitter T and receiver R, of a surface of constant phase, may be expressed as $$P = c\, T_p = \int_T^R \mu \cos\beta\, ds \quad (1)$$

where $\mu$ is the refractive index, $\beta$ the angle between wave normal and ray direction, and ds is an element of the ray path along which the integration is performed. In solving equation (1) it is necessary that the relevant properties of the medium are known such that radiorays, originating from the transmitter, T, and reaching the receiver R via the medium, can be specified. In an experimental setup the reverse procedure is prevalent, when it is of interest to deduce a reflection height from propagation data without knowing the detailed specifications of the propagation medium.

A method has been developed that permits determination of ionospheric reflection height from doppler measurements. For this method it is required that doppler signatures $\delta f(t)$ of at least two transmissions, involving for example, one single-hop and one multi-hop, are simultaneously detectable. The novel feature is that phase-path variations, caused by a moving reflection boundary, can be utilized to determine the reflection height by means of the rate-of-change of phase-path information of two transmissions involving a pair of available transmission paths being comprised of multi-hops or a single- and a multi-hop.

SUMMARY OF THE INVENTION

A method of determining ionospheric reflection height from doppler measurements made over an oblique radio transmission involving reflection of signals from a boundary. This method makes use of multi-hop reflections. The unknown motion of the reflection boundary is eliminated by taking the doppler-shift ratio for a pair of transmission hops. The height of the reflection boundary is then computed from this ratio for the particular distance that separates transmitter from receiver. The equations used follow from relatively simple geometrical considerations derived from physical boundaries.

Figure 1:
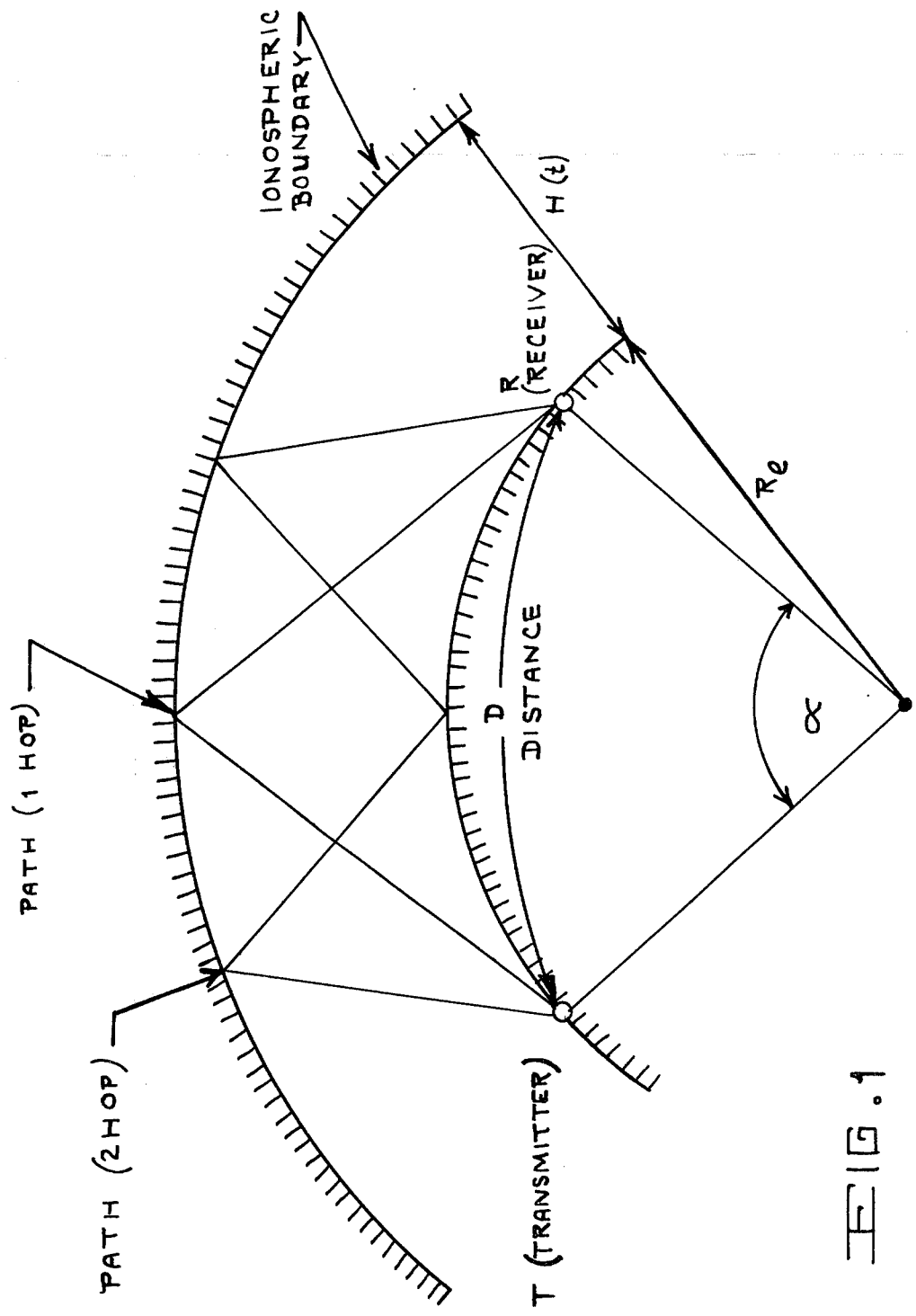
FIG. 1 illustrates the total path length between the transmitter, reflection boundary, and receiver, with H being the reflection height, $R_e$ the earth radius, and $\alpha$ corresponds to the angular distance between the transmitter and receiver.

The method of this invention, as illustrated in the apparatus of FIG. 1, permits determination of ionospheric reflection height from doppler measurements. For this method it is required that doppler signatures $\delta f(t)$ of at least two transmissions, involving for example one single-hop and one multi-hop, are simultaneously detectable. It is assumed that all reflections occur at the same height, H, of a spherical boundary $(R_e + H)$, that is concentric to a spherical earth ($R_e$ = 6378 km). A radial motion, dH/dt of this mirror-like boundary imparts different rate-of-phase-path changes (dP/dt) to the 1-hop, 2-hop, n-hop transmissions causing doppler shifts $$\delta f_n = -(f/c)(dP/dt)_n \quad 2.$$

where $f$ represents the carrier frequency of the transmission, $c$ the velocity of light in vacuum and $n$ the number of hops. Since $$\left(\frac{dP}{dt}\right)_n = \left(\frac{dP}{dH}\right)_n \cdot \left(\frac{dH}{dt}\right), \quad (3)$$

it is possible to determine $\delta f_n$, provided $(dP/dH)_n$ and $(dH/dt)$ are known. While $(dP/dH)_n$ is easily derivable from the geometrical configuration of the transmissions, $(dH/dt)$ is not known. The ratio $(dP/dH)_n$ can be expressed as $$\left(\frac{dP}{dH}\right)_n = \frac{2n\{H + R_e[1 - \cos(\alpha/2n)]\}}{\{H^2 + [2R_e^2 + 2R_eH][1 - \cos(\alpha/2n)]\}^{1/2}} \quad (4)$$

where P is the total path length between transmitter, reflection boundary, receiver, H is the reflection height, $R_e$ the earth radius; $\alpha$ corresponds to the angular distance ($\alpha = D/R_e$) between transmitter and receiver as illustrated in FIG. 1. The unknown rate-of-change of height with time (dH/dt) in equation (3) can be eliminated by using equation (4) and taking, for example, the ratio $(dP/dt)_{2hop}/(dP/dt)_{1\ hop}$. Accordingly, $$r = \frac{\left(\frac{dP}{dT}\right)_{n=2}}{\left(\frac{dP}{dt}\right)_{n=1}} = \frac{\left(\frac{dP}{dH}\right)_{n=2}}{\left(\frac{dP}{dH}\right)_{n=1}} \quad (5)$$

$$= 2\,\frac{[H + R_e(1 - \cos\alpha/4)]\,[H^2 + (2R_e^2 + 2R_eH)(1 - \cos\alpha/2)]^{1/2}}{[H + R_e(1 - \cos\alpha/2)]\,[H^2 + (2R_e^2 + 2R_eH)(1 - \cos\alpha/4)]^{1/2}}$$

Equation (5) is solved parametrically for D.

Figure 2:
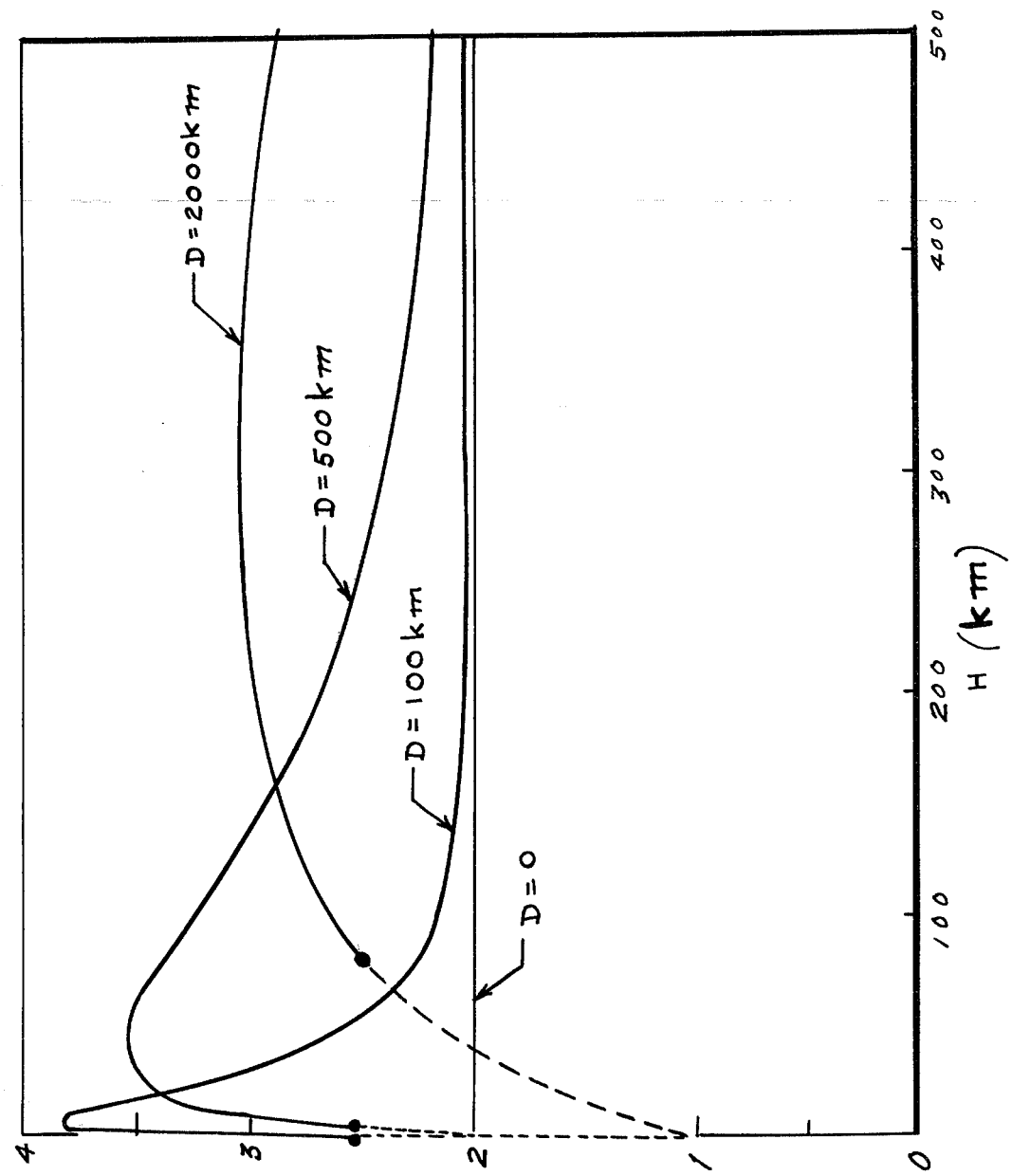
FIG. 2 illustrates the behavior of the ratio as a function of reflection height.

FIG. 2 illustrates the behavior of the ratio $(dP/dH)_{n=2}/(dP/dH)_{n=1}$ as a function of reflection height H, for $D = \alpha R_e = 0$, 100, 500 and 2000 km. Knowing the doppler ratio of the two- and one-hop transmissions, FIG. 2 can be used for inferring the reflection height. It is noted, however, that there exist two solutions of H, both physically meaningful. The height separation of these solutions varies with distance D. General knowledge about the reflection height, expected for a particular radio frequency and for a broad range of ionospheric conditions, permits selection of the plausible solution and rejection of the other. Comparing, for example, the general behavior of these curves with distance, it is seen that for short distances (D<<100 km) the effectiveness in height resolution is limited to the non-ionized portion of the atmosphere (H< 60 km). For $D = 500$ km, the height resolution of the ratio-method may be optimal for about 80 km < H <140 km, but continues to be acceptable up to $H = 350$ km. A ratio $r = 2.6$, for example, yields $H_1 = 5.5$ km, $H_2 = 220$ km.

For $D = 0$ (FIG. 2) the ratio $r$ equals two for all values of H and the ratio method is clearly useless for finding any reflection height. Curiously, for a spherical earth and for all values of D, the limit of $r$ is almost unity as $H \rightarrow 0$ and equals unity for $D = H = 0$. The dashed portions of the curves of FIG. 2 indicate, however, that the rays describing $P_{(1\ hop)}$ intersect the spherical earth before reaching a particular reflection height and are thus not meaningful in the context of satisfying a realizable reflection condition. The limiting condition is obtained when departing/arriving rays are tangent to the earth. This condition follows from $$H_{min} = R_e \left( \frac{1}{\cos\alpha/2} - 1 \right) \qquad (6)$$

which relates the minimum height of reflection to angular distance between transmitter and receiver. Equations (5) and (6) yield the ratio for this limiting condition, as illustrated in FIG. 2 by the dots separating solid and dashed lines. In the limit of $D \rightarrow 0$ ($H \rightarrow O$) this limiting ratio equals 2.5. For increasing values of D the ratio decreases and approaches 2 for $D \rightarrow \pi R_e$ while $H_{min} \rightarrow \infty$.

Figure 3:
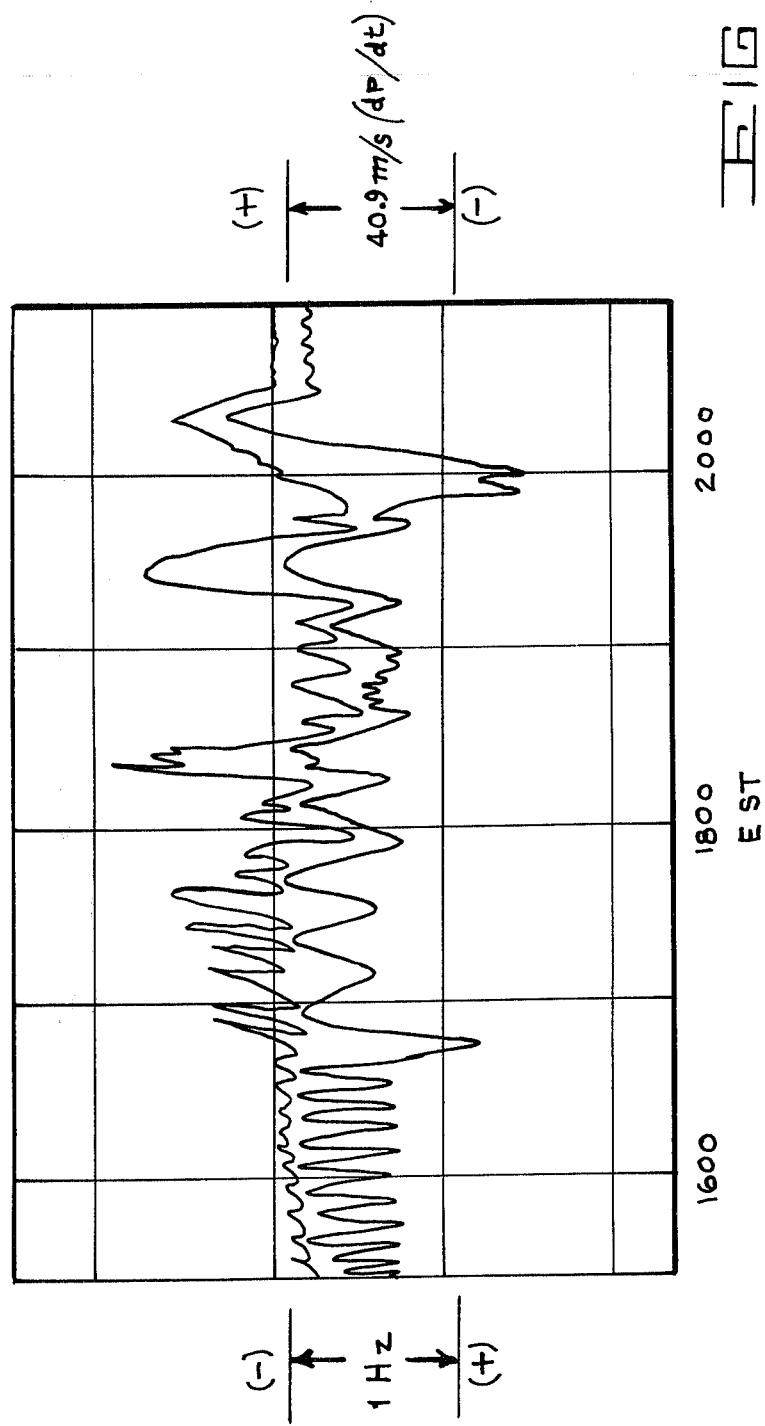
FIG. 3 illustrates the frequency variations over a specified period of time.

The method described above was applied to doppler measurements made over an oblique 7.335 MHz transmission from Time Station CHU, Ottawa, Canada, to AFCRL, Bedford, Mass. (D = 480 km). FIG. 3 illustrates the frequency variations observed from 1600 to 2100 EST on Mar. 1, 1969. Of particular interest for this study is the time interval 1900 – 2000 EST. An undulation of the doppler signature commences at 1916 EST, starting with zero doppler as deduced from ionospheric E-region reflections observed at noon, reaching a negative doppler shift of $\delta f_o = 0.62$ Hz, relative to zero, at 1928 EST and returning to zero at 1940 EST. For the same time interval, a second trace showing larger excursions in doppler shift is observed. Because of the similarity between these doppler signatures, it is assumed that the trace with the larger excursion represents the two-hop transmission, the other the one-hop transmission. Determining the ratio of these doppler shifts at 1930 EST using equations (3) and (5), one obtains $r = 2.32$. For $D = 480$, equation (5) provides a curve similar to those shown in FIG. 2, which yields a reflection height $H = 330$ km for $r = 2.32$.

The doppler undulation attributed to the one-hop transmission has a half-period $T/2 = 24$ min. The phase-path behavior is determined by time-integrating the doppler shift. Assuming, however, a sinusoidal undulation of the doppler shift for the event observed on the 7.335 MHz carrier, the corresponding phase-path perturbation amplitude $\Delta P_o(km)$ can be computed from the period, T(min) and the doppler shift maximum $\delta f_o$ (Hz) by $\Delta P_o = 0.39\ \delta f_o\ T == 11$ km for an undulation period $T = 48$ min.

Evaluating $dP/dH$ from equation (4) for $H = 330$ km, $D = 480$ km and $n = 1$, one can infer the height change $\Delta H_o$, associated with the phase-path perturbation amplitude $\Delta P_o = 11$ km, as $\Delta H_o = 7$ km. Thus, the ionosphere (reflection level) could be viewed as rising in 12 min by $\Delta H_o = 7$ km and over a half-period of 24 min by 14 km, whereupon it descends (positive doppler) starting at 1940 EST. In order to corroborate these results and validate the assumed correspondence between the doppler signatures, a selected set of ionograms, recorded on Mar. 1, 1969 near 1916, 1930, 1940 EST by the Highgate Springs Ionosonde of the Dartmouth College Ionosone network, located 100 km north of the midpoint between CHU and AFCRL, were examined. A transmission curve for 7.335 MHz was superimposed on the ionogram trace obtained for 1930 EST, yielding an equivalent vertical frequency of 5.9 MHz and a virtual reflection-height of 315 km. It was noted, however, that the undulation in reflection height, deduced from the sounder data, preceded by about 5 min those inferred from the doppler data. This suggested that the undulation phenomenon was associated with a wave motion in the ionosphere that raised the height of the F-region over Highgate Springs about 5 min earlier than over the CHU-AFCRL midpoint. Adjusting the reflection height by a translation in space to account for the delay corresponding to about 5 min in time, yielded a reduction from 315 km to 305 km reflection height, as deduced from the ionograms. This result of $H = 305$ km compares reasonably well with $H = 330$ km deduced from the multi-hop doppler signatures (see FIG. 3) using the ratio-method based on the simple geometry of FIG. 1.

Another corroborating evidence can be inferred from the height excursions associated with wave phenomenon as deduced from the ionograms, yielding $\Delta H_I = \pm 13$ km, and those from the doppler variation, yielding $\Delta H_D = \pm 7$ km. The ratio of these quantities is nearly two, as previously noted for a nighttime wave disturbance in the ionosphere.

In regard to errors of $r$ affecting the percent of errors of height determination, there was assembled a table with data taken from curve "$D = 500$ km" of FIG. 2. Errors in percent are derived from geometrical considerations only. For $D = 500$ km, the smallest error obtains for a height of 150 km. For $D = 1000$ km, the smallest error would result at $H = 220$ km. Thus, the optimal accuracy of the ratio method for a particular height regime of interest is achieved for a particular distance D. Departure from optimal accuracy is faster toward lower heights than toward greater heights. For $D = 500$ km the accuracies achievable for heights above the E region may be satisfactory for most of the ratio errors.

For a severely disturbed ionosphere, the presence of small-scale irregularities could preclude the identification of one- and two-hop transmissions because of signal scatter and increased attenuation. Under those conditions, and for lack of signal quality, it may not be possible to successfully apply the ratio method for obtaining height information.

The general limitation of the sensitive doppler method being useful only for determining relative phase-path variations of ionospherically reflected radio signals, has been extended by the finding that the ratios of multi- and single-hop doppler shifts could yield useful information on ionospheric reflection height.

What is claimed is:

1. The method for determining the ionospheric reflection height from doppler measurements over an oblique CW radio transmission being comprised of transmitting from a first predetermined position first and second identical CW signals obliquely toward a radial moving ionospheric boundary, said first and second signals being single-hop and multi-hop, respectively, receiving at a second predetermined position displaced from said first predetermined position said first and second signals, the radial motion of said boundary imparting different rate-of-phase-path changes to the one-hop, multi-hop transmissions causing a separate doppler shift for each at the receiver and determining said ionospheric boundary height from the doppler ratio of each of said received one-hop and multi-hop transmissions.

2. The method for determining the ionospheric reflection height as described in claim 1 wherein the doppler ratio is comprised of $(dP/dH)_{n=2} / (dP/dH)_{n=1}$ where H equals height and P the total path between transmitting position, reflection boundary and receiving position.

3. The method for determining the ionospheric reflection as described in claim 2 further including computing the ionospheric height from the doppler ratio.

* * * * *